(12) United States Patent
Stoeckl

(10) Patent No.: US 8,007,038 B2
(45) Date of Patent: Aug. 30, 2011

(54) VEHICLE BODY OF A MOTOR VEHICLE WITH A SIDE SILL

(75) Inventor: Peter Stoeckl, Raubling (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 50 days.

(21) Appl. No.: 12/369,206

(22) Filed: Feb. 11, 2009

(65) Prior Publication Data

US 2009/0206634 A1 Aug. 20, 2009

(30) Foreign Application Priority Data

Feb. 14, 2008 (DE) .................. 10 2008 009 088

(51) Int. Cl.
*B60R 13/02* (2006.01)
*B60R 3/00* (2006.01)
(52) U.S. Cl. ....................................... 296/209
(58) Field of Classification Search .................. 296/209, 296/199, 193.05, 193.07, 187.08, 187.12, 296/146.9
See application file for complete search history.

(56) References Cited

U.S. PATENT DOCUMENTS

| | | | | |
|---|---|---|---|---|
| 2,024,289 A * | 12/1935 | Hughes | .......................... | 296/209 |
| 2,813,497 A * | 11/1957 | Jaeckle | .......................... | 105/424 |
| 3,084,971 A * | 4/1963 | Schilberg | .......................... | 296/35.1 |
| 6,354,656 B1 * | 3/2002 | Hwang | .......................... | 296/209 |
| 7,168,757 B2 * | 1/2007 | Futatsuhashi | .................. | 296/209 |
| 7,234,764 B2 * | 6/2007 | Aizawa et al. | ................. | 296/209 |
| 7,354,102 B2 * | 4/2008 | Cave et al. | ..................... | 296/209 |
| 7,523,982 B2 * | 4/2009 | Yamaguchi | .................... | 296/209 |
| 7,665,795 B2 * | 2/2010 | Shishikura | .................. | 296/180.1 |
| 2002/0043821 A1 * | 4/2002 | Takashina et al. | ....... | 296/203.03 |
| 2005/0093343 A1 * | 5/2005 | Tokumoto et al. | ........... | 296/209 |
| 2006/0028056 A1 * | 2/2006 | Aizawa et al. | ................. | 296/209 |
| 2006/0066139 A1 * | 3/2006 | Futatsuhashi | ................. | 296/209 |
| 2006/0145516 A1 * | 7/2006 | Yamamoto | .................... | 296/209 |
| 2009/0167010 A1 * | 7/2009 | Rompage et al. | ............ | 280/847 |
| 2009/0261622 A1 * | 10/2009 | Rill et al. | ...................... | 296/209 |
| 2010/0038931 A1 * | 2/2010 | Ihashi et al. | .................. | 296/209 |

FOREIGN PATENT DOCUMENTS

| | | |
|---|---|---|
| DE | 2432787 A1 | 1/1976 |
| DE | 4133248 A1 | 4/1993 |
| DE | 4140426 A1 | 6/1993 |
| DE | 19538844 A1 | 4/1997 |
| DE | 19633911 A1 | 2/1998 |
| DE | 29900510 U1 | 8/1999 |
| DE | 102006034977 A1 | 1/2008 |
| EP | 1099584 A1 | 5/2001 |

* cited by examiner

Primary Examiner — H Gutman
(74) Attorney, Agent, or Firm — Muncy, Geissler, Olds & Lowe, PLLC

(57) ABSTRACT

According to the invention, a side sill of a vehicle body of a motor vehicle comprises an outer shell and an inner shell connected to each other via flanges. A reinforcement is removably attached to the outside of the outer shell, which reinforcement extends essentially over the entire length of the side sill in the vehicle longitudinal direction. By means of this reinforcement, a load introduced onto a point of the side sill is absorbed and distributed. This is especially relevant to achieving better crash characteristics in a side pole crash.

17 Claims, 1 Drawing Sheet

VEHICLE BODY OF A MOTOR VEHICLE WITH A SIDE SILL

CROSS-REFERENCE

This application is a U.S. non-provisional application claiming the benefit under 35 U.S.C. §119(a) of the filing date of German patent application No. 10 2008 009 088.3, filed Feb. 14, 2008.

TECHNICAL FIELD

This invention is related to a system for reinforcement a side sill of a vehicle.

BACKGROUND ART

From the patent EP 1 099 584 A1, a vehicle body for a motor vehicle with a side sill is known. The side sill comprises a reinforcement extending in the vehicle longitudinal direction, which particularly can, to a large extent, ensure a safe passenger compartment in the case of a side impact. The reinforcement extends approximately along the entire length of the side sill, and is fixed in the area of the A-, B- and C-columns of the vehicle body via retaining elements.

SUMMARY OF THE INVENTION

The object of the invention is to provide a side sill of a vehicle body of a motor vehicle, wherein the rigidity of the vehicle body can be increased in a simple way by an additional reinforcement.

This object is solved with a vehicle body of a motor vehicle having a side sill comprising: an outer shell, an inner shell, and a reinforcement extending in the vehicle longitudinal direction along the length of the side sill and removably attached to the outer shell. Further advantages are provided by a vehicle body of a motor vehicle comprising a side sill comprising an outer shell having an inset area on an outer surface of the outer shell, an inner shell attached to the outer shell, a hat-shaped profile arranged between the outer shell and the inner shell, such that an assembly of the outer shell, the inner shell, and the hat-shaped profile comprises at least three closed cavities, and a reinforcement extending in the vehicle longitudinal direction between one of an A-column and a B-column of the vehicle and a rear area of a passenger compartment.

Because of the reinforcement, a load acting on a point of the side sill is absorbed and distributed along a longer area of the side sill. This has a special relevance for achieving better crash characteristics in the case of a side pole crash, for example, as noted in the current testing specification FMVSS 214.

The reinforcement is removably fixed to the outer shell, for example, with screws and/or with rivets. In this way, the side sill can be stiffened after the assembly of the frame of the vehicle body has been assembled by attaching the reinforcement. This can, for example, be a great advantage for the assembly of various derivates of motor vehicle models. For instance, the vehicle body of a convertible, because of its missing roof, has lower stiffness than the vehicle body of a limousine of the same vehicle model. Therefore, the vehicle body of a convertible requires a side sill with a higher stiffness. The side sill according to the invention makes it possible that the same side sill can be installed in the vehicle frame for a convertible vehicle as well as for a limousine, so that no variation in the vehicle frame is necessary for the two different vehicles. The vehicle body of the convertible is stiffened after the building of the frame by the attachment of the reinforcement member in the side sill, so that this vehicle body also comprises a sufficient stiffness. Also, the selection of the material of the reinforcement does not have to be made with attention to its weldability and the paintability, because the reinforcement may be mounted after the frame assembly and after the painting.

The reinforcement extends in the vehicle longitudinal direction substantially along the entire length of the side sill, therefore, approximately from the area of an A-column to the area of a heel plate in the vehicle body of the vehicle. The A-column forms the front boundary of the passenger compartment. Between the right and the left A-columns extends a windshield support, which comprises the lower support for the windshield, and a supporting member for the instrument panel. The heel plate forms the rear boundary of the legroom in the passenger compartment. In the area of the heel plate runs the so-called seat crossbeam, which attaches the two side sills together in the rear area in the vehicle transverse direction. When the reinforcement extends approximately over the entire length of the side sill, it can, in the case of a side impact, together with the actual side sill, absorb the forces originating from the side impact, and can deflect them forward to the A-column, for example, via the lower windshield support and the supporting tube, as well as in the rear direction over the seat crossbar, without any appreciable deformation of the passenger compartment occurring.

The reinforcement must, according to specifications, comprise a relatively high bending stiffness. Therefore, advantageously the reinforcement comprises a closed cross section, for example, a closed hollow space. Further, the reinforcement can also be composed of a high-strength steel, for instance a steel with a yield strength of 800 MPa or more. For example, the reinforcement can be realized according to a roll profile, which can be assembled in simple ways from metal blanks or sheets, which can be comprised of high-strength types of steel.

Preferably, a hat-shaped profile is arranged in the hollow space between the inner and the outer shell to increase the stiffness of the side sill extending in the vehicle longitudinal direction. The hat-shaped profile is attached with its upper and lower end portions to the inner shell, and with its middle area to the outer shell. Thereby, the hat-shaped profile subdivides the space between the inner and the outer shell into three separate hollow spaces, and, therefore, the stiffness of the entire side sill is significantly increased. From the state of the art it is already known to stiffen either the inner shell or the outer shell with a hat-shaped reinforcement member. Such a known reinforcement member raises the overall stiffness of the side sill considerably less than a hat-shaped profile connected with both the inner member and the outer member. The risk that the side sill collapses in a crash can therefore be almost completely eliminated.

Advantageously, the outer shell of the side sill comprises an inset which can be seen from the outside, in which the reinforcement may be arranged. Thereby, the total dimensions of the side sill in the vehicle lateral direction do not increase or increase only trivially, because the reinforcement is assembled so as to lie at least partially in the inset area.

Ideally, the outer shell is connected with the hat-shaped profile in the area of the inset. In the case of a side crash, for example, with a side pole, large forces act on the reinforcement and on the outer shell. These forces are at least partially distributed introduced into the hat-shaped profile and, therefore, also into the inner shell, so that the hat-shaped profile and the inner shell both can contribute to the absorption of the crash forces.

It is advantageous that the reinforcement can simultaneously act as a stepping board. Particularly, Sport Utility Vehicles (SUV) may comprise a stepping board for facilitating climbing in and out of the vehicle. These stepping boards are commonly offset laterally from the side sill. Therefore, in the state of the art, an additional holder is attached that can accommodate the separate stepping board. According to the invention, the reinforcement of the side sill can be arranged such that it can also perform the function of a stepping board. Therefore, no additional components are needed for the stepping board or the attachment of the stepping board.

An exemplary embodiment of the invention is illustrated in the single drawing, according to which the invention will be described in more detail in the following.

DETAILED DESCRIPTION

Figure 1:
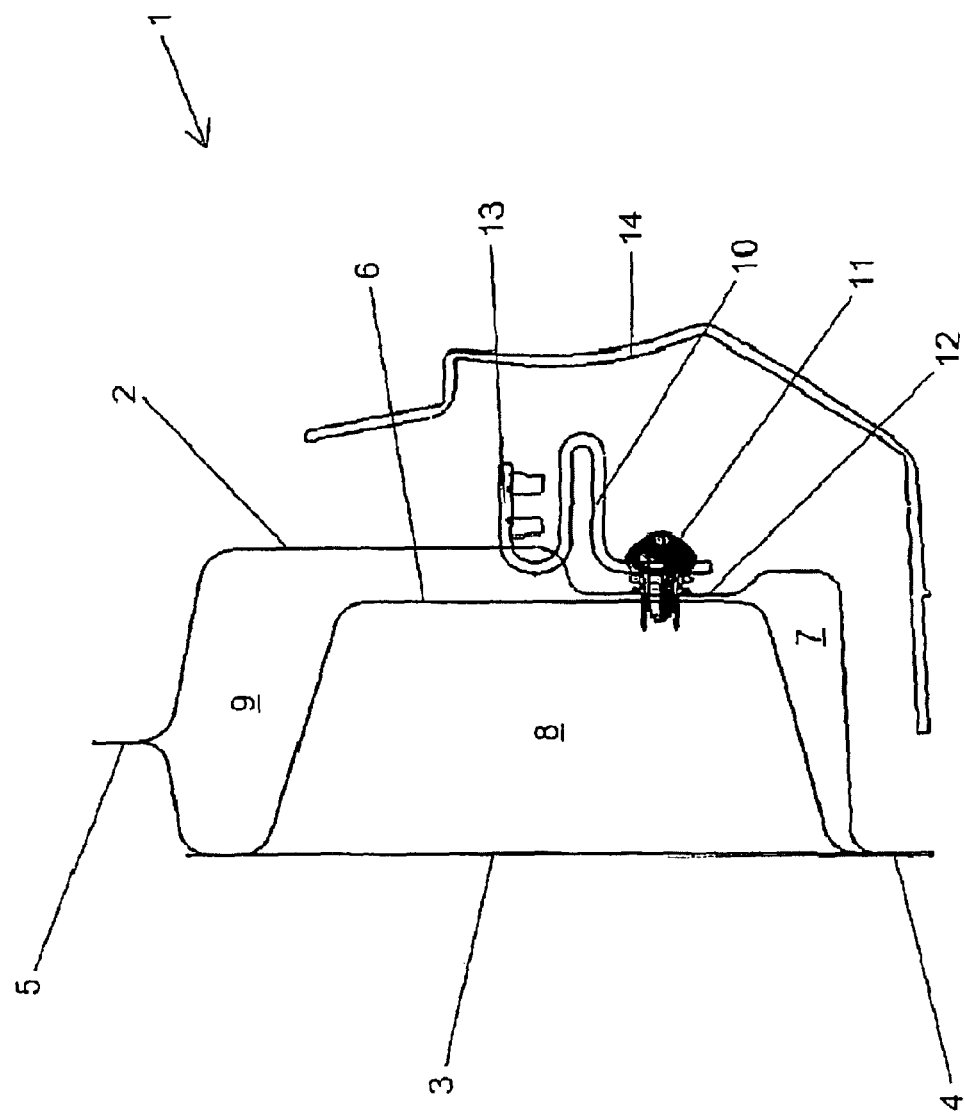
FIG. 1 shows a cross section of the side sill of a vehicle body of a motor vehicle, according to an embodiment of the invention.

In the FIGURE, a side sill 1 having a shell-type construction is shown, which side sill 1 extends in the vehicle longitudinal direction from an A-column of the vehicle body to a rear wheel housing. The side sill 1 is constructed in a shell construction and comprises an outer shell 2 and an inner shell 3 composed of, for example, sheet metal. The outer shell 2 may formed from high-strength metal blanks having a yield strength of 1000 MPa. The outer shell and the inner shell are connected to each other by an upper and a lower flange 4 and 5.

A hat-shaped profile 6 is arranged in the space between the outer and inner shells 2, 3. The hat-shaped profile 6 is connected by the lower flange 4 with the outer and the inner shells 2 and 3 in the area of the lower edge of the hat-shaped profile 6. The middle area of the hat-shaped profile 6 is connected with the outer shell 2 between the lower and the upper flanges 4 and 5. Therefore, the hat-shaped profile 6 and the outer shell 2 extend between these connections and the lower flange 4, offset from each other such that they form a lower cavity 7. The upper area of the hat-shaped profile 6 is attached to an upper portion of the inner shell 3. Thereby, the inner shell 3 and the hat-shaped profile 6 surround a middle cavity 8 via the lower flange 4 and the attachment point between the hat-shaped profile and the inner shell 3. The outer shell 2, the inner shell 3, and the hat-shaped profile 6 further form a third upper cavity 9 above the hat-shaped profile 6. The space between the outer and the inner shell 2 and 3 is therefore subdivided into three cavities by the hat-shaped profile 6, namely, the lower cavity 7, the middle cavity 8, and the upper cavity 9. The hat-shaped profile 6 extends along the entire length of the side sill 1. It may be composed of a hot-formed high-strength steel, advantageously, from a steel having a yield strength of at least 1000 MPa. Therefore, the hat-shaped profile 6 considerably increases the stiffness of the side sill 1.

The side sill 1 may be screwed to the outside of the reinforcement 10 with several screws 11. The reinforcement 10 extends in the vehicle longitudinal direction practically over the entire length of the side sill 1, and is, in regularly-spaced intervals, attached to the side sill 1 with screws. The reinforcement 10 comprises a curved sheet metal profile composed of a high-strength steel. The reinforcement 10 distributes a force acting on a point on the side of the side sill 1 in the longitudinal direction, for example, a force arising from a pole impact, so that the side sill does not buckle at the point of impact of the force. For stiffness reasons, the reinforcement 10 is fixed in the area of the outer shell 2 in which the outer shell is connected with the hat-shaped profile 6. The reinforcement 10 is, therefore, not only screwed to the outer shell 2, but also to the middle area of the hat-shaped profile 6. Therefore, the danger is considerably less that a screw can be ripped out than in the case when the reinforcement 10 is only screwed to the outer shell 2. The area of the outer shell 2 on which the reinforcement 10 is arranged comprises, therefore, an inset 12 oriented toward the inner shell 3. Therefore, the dimensions of the side sill 1 increase only marginally due to the addition of the reinforcement 10 in the vehicle transverse direction, because the reinforcement 10 is at least partially assembled in the inset 12.

The reinforcement 10 may also comprise a step 13 offset from the vehicle exterior that may serve as a stepping board. These types of stepping boards make climbing in and out of the vehicle easier for particularly high vehicles, like, for example, SUVs. These stepping boards are typically attached to the side sill 1. In this case, the reinforcement 10 can simultaneously serve as a stepping board, so that no separate stepping board with additional mounts must be connected with the side sill 1.

For aesthetic reasons, the entire side sill 1, with the step 13 of the reinforcement 10 serving as the stepping board, can be encased with a plastic member 14. The plastic member 14 can have a variety of shapes and designs, and serves to visually cover the side sill 1 from view.

The side sill 1 constitutes the lower boundary of a side door opening of a vehicle body. The door opening is closable with at least one side door, which, in the closed condition, overlaps the side sill 1 in the height direction. In the lower portion of the side door, a crash reinforcement composed of high-strength steel may be arranged in the side door and extends along the entire length of the side door.

If a side crash occurs, the possible crash energy impacted on a point in the side door in the lower area of the side door may be distributed by the crash reinforcement along the entire length of the side door. Thereby, the side door is deformed so that it abuts the side sill 1. The very stiff side sill 1 with the reinforcement 10 further distributes the remaining crash energy along the entire length of the side sill 1 and delivers the crash energy to the A-column and to the seat crossbar so that the passenger compartment is protected. The stiffness of the side sill 1 is, therefore, because of the reinforcement 10, so high that even a local penetration of a pole into the side of the vehicle body poses little or no danger for the passengers in the passenger compartment.

The side sill 1 illustrated in FIG. 1, with the reinforcement 10, features a very high stiffness. Such a high stiffness is especially necessary for convertible vehicles, because the overall stiffness of the vehicle frame of a convertible vehicle, because of the missing roof, is considerably less than the entire stiffness of, for example, a sedan of the same vehicle type. It can also be the case that a less stiff side sill would be completely sufficient for the necessary overall stiffness of the vehicle body of a sedan. The side sill 1 according to the invention makes it possible that, in this case, the reinforcement 10 can be left out such that, in this way, an adaptation for several derivates of a vehicle type is possible without having to change the frame of the vehicle.

The reinforcement 10 is designed as an assembly part. It can be screwed to the side sill 1 for the vehicle derivatives which require it based on their stiffness requirements. The variation of assembly based on the type of vehicle derivative therefore also occurs after the assembly of the frame and during the end assembly of the vehicles. Therefore, several different variations do not need to be accounted for during the frame construction. This simplifies the vehicle frame construction stage considerably. Also, it is very simple to construct a vehicle having a slimmed side sill 1 without a reinforcement 10, i.e., the reinforcement is simply not mounted. The slimmed side sill has the advantage that it is essentially lighter and more cost effective. It presupposes that the overall stiffness of the vehicle is already sufficiently high.

According to an aspect of the invention, a vehicle body of a motor vehicle with a side sill 1 in a shell construction comprises an outer shell 2 and an inner shell 3, characterized in that a reinforcement 10 is removably attached to the outside of the outer shell 2, wherein the reinforcement 10 extends along the vehicle longitudinal axis substantially over the entire length of the side sill 1.

According to another aspect of the invention, the vehicle body further comprises a hat-shaped profile 6 arranged in the cavity between the outer shell 2 and the inner shell 3 for increasing the stiffness of the side sill 1, wherein the hat-shaped profile 6 extends in the vehicle longitudinal direction, and, wherein its upper and lower portions are attached to the inner shell 3, and its middle area is connected to the outer shell 2.

According to another aspect of the invention, the outer shell 2 comprises an inset 12 which can be seen from the outside, wherein the reinforcement 10 is arranged inside the inset 12.

According to another aspect of the invention, the outer shell 2 is connected with the hat-shaped profile 6 in the area of the inset 12.

According to another aspect of the invention, the reinforcement 10 is removably fixed to the outer shell 2 in the area in which the outer shell 2 is connected with the hat-shaped profile 6.

According to another aspect of the invention, the reinforcement 10 is adapted to be removably attached to outer shell 2 and the hat-shaped profile 6.

According to another aspect of the invention, the reinforcement 10 is adapted to be fixed with screws 11 and/or rivets.

According to another aspect of the invention, the reinforcement 10 comprises a cross section having a closed cavity.

According to another aspect of the invention, the reinforcement 10 is composed of high-strength steel.

According to another aspect of the invention, the reinforcement 10 simultaneously serves as a stepping board 13.

The invention claimed is:

1. A side sill for a vehicle body, comprising:
    an outer shell,
    an inner shell,
    a reinforcement extending in the vehicle longitudinal direction along the length of the side sill which reinforcement comprises a curved sheet metal profile and is removably attached to the outer shell by at least one of screws and rivets so as to increase the stiffness of the side sill and distribute a force acting on a point on a side of the side sill in a longitudinal direction, and
    a hat-shaped profile extending in the vehicle longitudinal direction and arranged between the outer shell and the inner shell,
    wherein upper and lower portions of the hat-shaped profile are attached to the inner shell and a middle area of the hat-shaped profile is attached to the outer shell.

2. The side sill of claim 1, wherein the reinforcement extends substantially along the entire length of the side sill.

3. The side sill of claim 1, further comprising an inset located on an outer surface of the outer shell wherein the reinforcement is at least partially arranged inside the inset and wherein the outer shell is connected with the hat-shaped profile in an area of the inset.

4. The side sill of claim 1, wherein the reinforcement is adapted to be removably attached to the outer shell and the hat-shaped profile.

5. The side sill of claim 4, wherein the reinforcement and the hat-shaped profile are removably attached to the outer shell in the same area of the outer shell.

6. The side sill of claim 1, wherein the assembly of the outer shell, the inner shell, and the hat-shaped profile comprises at least three closed cavities.

7. The side sill of claim 1, wherein the reinforcement comprises at least one closed cavity when fixed to the outer shell.

8. The side sill of claim 1, wherein the reinforcement is composed of high-strength steel.

9. The side sill of claim 1, wherein the reinforcement provides a step for stepping into the vehicle.

10. The side sill of claim 1, wherein the at least one of screws and rivets attaching the reinforcement are fixed into the outer shell and the hat-shaped profile, the at least one of screws and rivets being in direct contact with the hat-shaped profile.

11. The side sill of claim 1, wherein the curved sheet metal profile includes at least one of an S-shaped portion and a U-shaped portion having first and second parallel, linear legs.

12. The side sill of claim 1, including a garnish mounted over the reinforcement and the outer shell.

13. The side sill of claim 12, wherein the garnish is spaced from the reinforcement over a central length of the reinforcement.

14. A vehicle body of a motor vehicle comprising:
    a side sill comprising:
    an outer shell having an inset area on an outer surface of the outer shell,
    an inner shell attached to the outer shell,
    a hat-shaped profile arranged between the outer shell and the inner shell, such that an assembly of the outer shell, the inner shell, and the hat-shaped profile comprises at least three closed cavities,
    a reinforcement extending in the vehicle longitudinal direction between one of an A-column and a B-column of the vehicle and a rear area of a passenger compartment which reinforcement comprises a curved sheet metal profile and is removably attached to the outer shell by at least one of screws and rivets so as to distribute a force acting on a side of the side sill in longitudinal direction,
    wherein upper and lower portions of the hat-shaped profile are attached to the inner shell and a middle area of the hat-shaped profile is attached to the outer shell.

15. The vehicle body of claim 14, wherein the reinforcement and the hat-shaped profile are removably attached to the outer shell in the inset area.

16. The vehicle body of claim 14, wherein the reinforcement provides a step for stepping into the vehicle.

17. The vehicle body of claim 14, further comprising a vehicle side door comprising a crash reinforcement arranged in the side door, wherein the side door, when in a closed condition, overlaps the side sill.

* * * * *